United States Patent
Shioiri et al.

(10) Patent No.: US 9,939,030 B2
(45) Date of Patent: Apr. 10, 2018

(54) FIXATION STRUCTURE FOR SELECTABLE ONE-WAY CLUTCH

(71) Applicant: TOYOTA JIDOSHA KABUSHIKI KAISHA, Toyota-shi, Aichi-ken (JP)

(72) Inventors: Hiroyuki Shioiri, Yokohama (JP); Hideaki Komada, Gotemba (JP); Hiroyuki Shibata, Odawara (JP); Yuki Kurosaki, Susono (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 232 days.

(21) Appl. No.: 15/046,793

(22) Filed: Feb. 18, 2016

(65) Prior Publication Data
US 2016/0245346 A1  Aug. 25, 2016

(30) Foreign Application Priority Data

Feb. 20, 2015  (JP) .................................. 2015-031419

(51) Int. Cl.
*F16D 41/12* (2006.01)
*F16D 41/16* (2006.01)
*F16D 41/26* (2006.01)
*F16D 41/14* (2006.01)

(52) U.S. Cl.
CPC ........... *F16D 41/12* (2013.01); *F16D 41/125* (2013.01); *F16D 41/14* (2013.01)

(58) Field of Classification Search
None
See application file for complete search history.

(56) References Cited

U.S. PATENT DOCUMENTS

2010/0252384 A1  10/2010  Eisengruber

FOREIGN PATENT DOCUMENTS

| JP | 06-010232 Y2 | 3/1994 |
|----|--------------|--------|
| JP | 2002-039224 A | 2/2002 |
| JP | 2007-247688 A | 9/2007 |

*Primary Examiner* — Jacob S. Scott
(74) *Attorney, Agent, or Firm* — Andrews Kurth Kenyon LLP

(57) ABSTRACT

A fixation structure for a selectable one-way clutch that can prevent engagement delay and imperfect engagement of the selectable one way clutch is provided. The fixation structure comprises a ridge formed on a back face of the pocket plate to be splined to a casing. The ridge is situated radially inner side of a strut held in a pocket plate.

3 Claims, 3 Drawing Sheets

I-I

FIXATION STRUCTURE FOR SELECTABLE ONE-WAY CLUTCH

The present invention claims the benefit of Japanese Patent Application No. 2015-031419 filed on Feb. 20, 2015 with the Japanese Patent Office, the disclosure of which is incorporated herein by reference in its entirety.

BACKGROUND

Field of the Invention

Preferred example relates to the art of a selectable one-way clutch adapted to selectively enable a torque transmission only in one direction and to interrupt torque transmission in both directions, and especially to a fixation structure for selectable one-way clutch.

Discussion of the Related Art

One example of the selectable one-way clutch is described in JP-U-6-10232. According to the teachings of JP-U-6-10232, the one-way clutch is fixed to a housing by engaging spline ridges on an outer race of the one-way clutch with spline grooves on an inner face of the housing.

The one-way clutch is selectively brought into engagement depending on a direction of torque applied thereto. However, an engagement or disengagement of the one-way clutch should be delayed inevitably by rotating the one-way clutch within an end play between the spline ridge and the spline groove. Specifically, the selectable one-way clutch is brought into a torque transmittable condition by bringing a strut held in one of rotary plates into engagement with a notch formed on the other rotary plate opposed thereto through an aperture formed on a selector plate (or a slide plate) interposed between those plates. In the selectable one-way clutch of this kind, the strut may be displaced from the aperture due to end play between the spline ridge and the spline groove to cause an engagement delay of the selectable one-way clutch or uneven contact between the strut and the notch.

SUMMARY OF THE INVENTION

Aspects of preferred example has been conceived noting the foregoing technical problems, and it is therefore an object of the preferred embodiment is to provide a fixation structure for a selectable one-way clutch configured to prevent an imperfect engagement or an engagement delay due to end play in a spline.

Preferred example relates to a fixation structure for a selectable one-way clutch, comprising: a pocket plate and a notch plate being opposed to each other; a strut held in a pocket of the pocket plate while being allowed to project from the pocket; and a selector plate having an aperture for letting through the strut that is interposed between the pocket plate and the notch plate while being allowed to rotate therebetween. In order to achieve the above-explained objective, according to the preferred example, the fixation structure is provided with a stationary member opposed to a back face of the pocket plate opposite to the notch plate to which the pocket plate is fixed, and an engagement portion formed on the back face of the pocket plate that is brought into abutment to the stationary member to stop rotation of the pocket plate. In addition, a radial distance between the engagement portion fitted with the stationary member and a rotational center axis of the pocket plate is shorter than that between the strut and the rotational center axis of the pocket plate.

Specifically, the engagement portion is fitted with the stationary member while assuring a predetermined end play in a rotational direction of the pocket plate.

In addition, the engagement portion may be a ridge formed on the back face of the pocket plate in such a manner to be splined to the stationary member.

Thus, according to the preferred example, the fixation structure is provided with the engagement portion formed on the back face of the pocket plate that is brought into abutment to the stationary member to stop rotation of the pocket plate. In addition, the engagement portion is situated radially inner side of the strut held in the pocket of the pocket plate. According to the preferred example, when one of the struts is brought into engagement with the notch plate prior to the other strut symmetry with respect thereto, the pocket plate is allowed to be rotated by the principle of leverage utilizing a contact point between the engagement portion and the stationary member as a fulcrum. For this reason, an engagement delay and an imperfect engagement of the selectable one-way clutch may be prevented.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
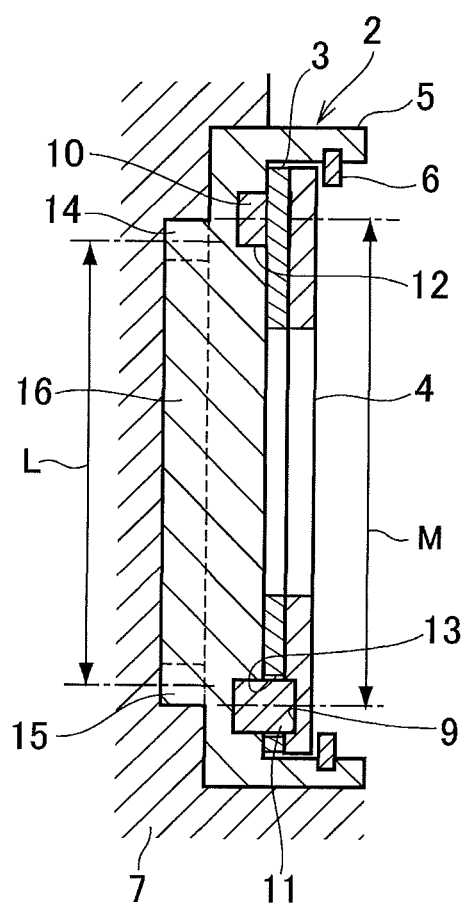
FIG. 1 is a cross-sectional view showing a cross-section of the fixation structure of the selectable one-way clutch according to the preferred example along I-I line shown in FIG. 3.

A preferred example of the fixation structure for a selectable one-way clutch (to be abbreviated as the "SOWC hereinafter") 1 will now be explained with reference to the accompanying drawings. FIG. 3 shows the fixation structure for the SOWC 1 according to the preferred example, and FIG. 1 shows a cross-section of the fixation structure along I-I line in FIG. 3 (*a*). Specifically, a lower half of FIG. 1 shows a situation in which a below-mentioned strut 11 is brought into engagement with a below-mentioned notch 9, and an upper half of FIG. 1 shows a situation in which the strut 11 is brought into engagement with the notch 9. A fundamental structure of the SOWC 1 is similar to those of the conventional SOWCs taught e.g., by JP-A-2014-526658 etc. As illustrated in FIG. 1, the SOWC 1 comprises a pocket plate 2, a selector plate 3 and a notch plate 4.

Specifically, the pocket plate 2 is an annular plate member having a short cylinder 5 in its outer circumference. The selector plate 3 and the notch plate 4 are held in the pocket plate 2 in the order shown in FIG. 1, and a snap ring 6 is fitted onto an inner circumference of the cylinder 5 to close the pocket plate 2. That is, the pocket plate 2 and the notch plate 4 are opposed to each other, and the selector plate 3 is interposed therebetween while being allowed to rotate.

Figure 3A:
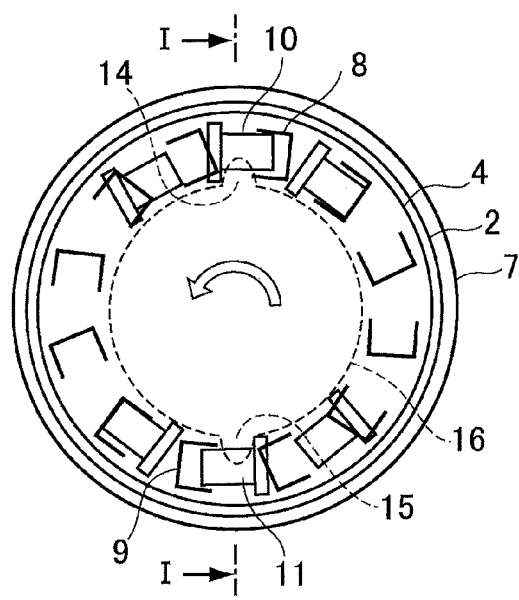
FIG. 3a is a rear view of the fixation structure from an opposite side of FIG. 2 showing a situation in which the strut is disengaged from the notch.

As illustrated in FIG. 3*a*, a plurality of struts are arranged on a face of the pocket plate 2 opposed to the notch plate 4 in a circular manner. Here, it is to be noted that reference numeral is allotted only to an upper strut 10 and a lower strut 11 for the convenience of explanation. Each strut 10 and 11 is individually held in a pocket formed on said face of the pocket plate 2 in a pivotal manner to be projected toward and withdrawn from the notch plate 4.

Specifically, each strut is shaped into a rectangular piece, and allowed to pivot around one of longitudinal ends thereof as a fulcrum to protrude other end (as will be called the "leading end" hereinafter) toward the notch plate 4, and to withdraw the other end into the pocket of the pocket plate 2. In the lower half of FIG. 11, there is shown a situation in which the leading end of lower strut 11 is elastically pushed up by a spring (not shown) disposed between each of the strut and a bottom of the pocket of the pocket plate 2. By contrast, in the upper half of FIG. 1, there is shown a situation in which the upper strut 10 is pushed into the pocket of the pocket plate 2 by the selector plate 3 against the spring.

A plurality of apertures (i.e., through holes) are also formed on the selector plate 3 at radially same level as the pockets of the pocket plate 2 and in the same number as the pockets. Here, it is to be noted that reference numeral is also allotted only to an upper aperture 12 and a lower aperture 13 for the convenience of explanation. As shown in the lower half of FIG. 1, when the selector plate 3 is rotated in the pocket plate 2 to a position at which the lower aperture 13 is overlapped with the pocket of the pocket plate 2, the leading end of the lower strut 11 is allowed to be pushed up by the spring toward the notch of the notch plate 4 through the lower aperture 13. By contrast, when the selector plate 3 is rotated in the pocket plate 2 to a position at which the upper aperture 12 is displaced from the pocket of the pocket plate 2, the leading end of the upper strut 10 is pushed into the pocket of the pocket plate 2 by an edge of the upper aperture 12 as shown in the upper half of FIG. 1

The notch plate 4 is also an annular plate member, and a plurality of notches are formed on a face of the notch plate 4 facing to the pocket plate 2 at radially same level and in the same number as the pockets of the pocket plate 2 and apertures of the selector plate 3. Here, it is to be noted that reference numeral is also allotted only to an upper notch 8 and a lower notch 9 for the convenience of explanation. When the leading end of the strut 10 (11) is pushed into the notch 8 (9) through the aperture 12 (13), the leading end of the strut 10 (11) is brought into abutment to an inner wall of the notch 8 (9).

Figure 2:
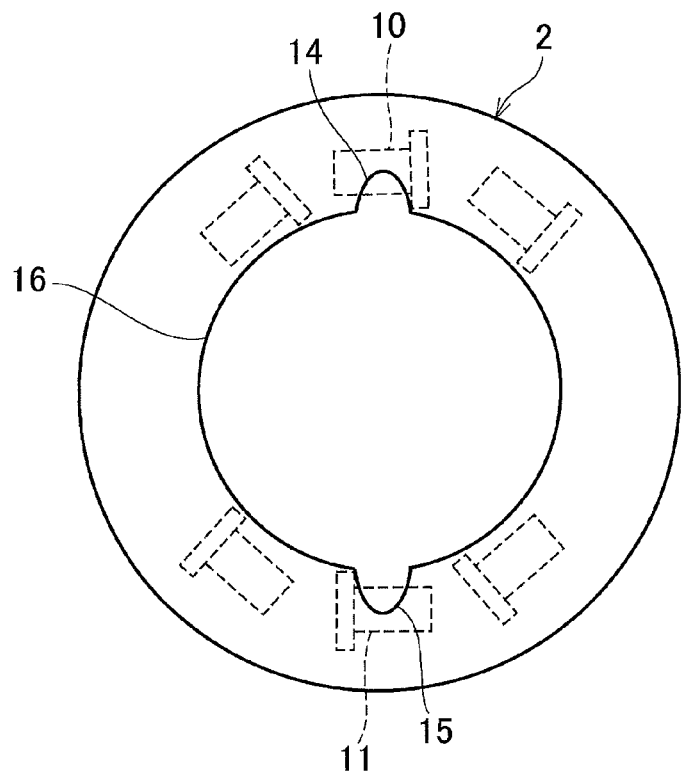
FIG. 2 is a schematic illustration of the fixation structure of the selectable one-way clutch according to the preferred example.

As depicted in FIGS. 1 and 2, according to the preferred example, a pair of ridges 14 and 15 serving as the claimed engagement portion is formed on a back face of the pocket plate 2 opposite to the face on which the pockets are formed, and each of the ridge 14 and 15 is individually splined to a spline groove (not shown) of a casing 7. That is, the pocket plate 2 is fixed to the casing 7 as a stationary member by fitting the ridges 14 and 15 on the pocket plate 2 into the spline grooves on the casing 7. In order to fit the ridges 14 and 15 smoothly into the spline grooves, a slight end play is assured between each of the ridge and an inner wall of the spline groove in a rotational direction of the SOWC 1.

Specifically, as illustrated in FIGS. 1 and 2, the ridges 14 and 15 are formed on an outer circumference of a circular protrusion 16 protruding from the back face of the pocket plate 2 symmetrically across a center of the pocket plate 2. As shown in FIG. 1, according to the preferred example, a pitch diameter L between the ridges 14 and 15 is shorter than a pitch diameter M between the struts 10 and 11 (L<M). That is, the ridges 14 and 15 are situated on radially inner side of the struts 10 and 11. Thus, each of the ridge 14 and 15 is individually fitted into the spline groove of the casing 7 at a site radially closer to the center axis of the pocket plate 2 than the struts 10 and 11.

Next, here will be explained an action of the SOWC 1 with reference to FIGS. 3*a* to 3*c*. The SOWC 1 is brought into engagement to transmit torque therethrough by rotating the selector plate 3 to the position at which each of the aperture 12 and 13 is individually overlapped with each of the pocket of the pocket plate 2 individually holding the strut 10 and 11. To this end, the selector plate 3 is connected to a drive unit (not shown) such as an electromagnetic actuator. Here, according to the example shown in FIG. 3, a torque is transmitted counterclockwise from the botch plate 4 side.

When the selector plate 3 is rotated to the position at which the apertures 12 and 13 are overlapped with the pockets of the pocket plate 2 by the actuator, each of the strut 10 and 11 is individually allowed to be pushed into each of the notch 8 and 9. In this situation, however, the lower strut 11 may be delayed to be pushed up by a viscosity of lubrication oil remaining in a lower portion of the SOWC 1.

Figure 3B:
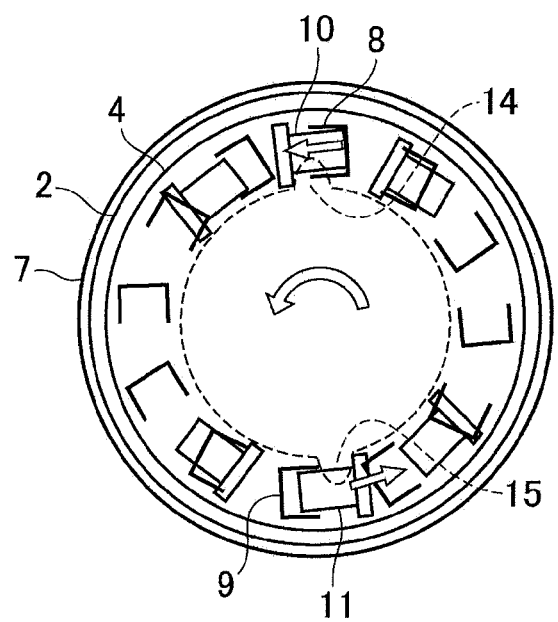
FIG. 3b is a rear view of the fixation structure from an opposite side of FIG. 2 showing a situation in which one of the struts is brought into engagement with the notch.
Figure 3C:
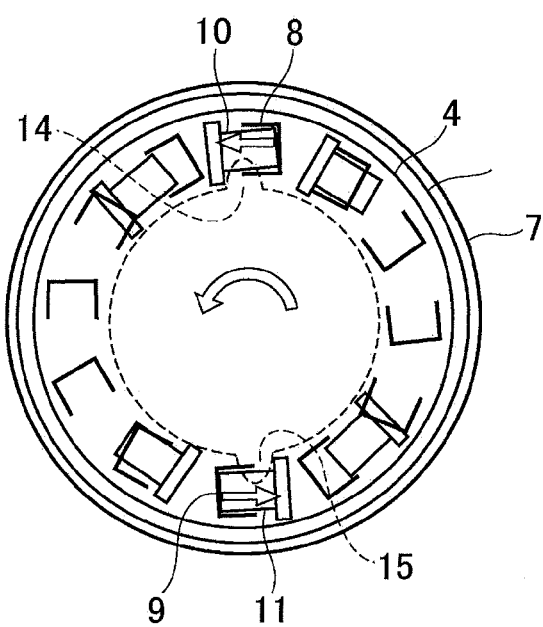
FIG. 3c is a rear view of the fixation structure from an opposite side of FIG. 2 showing a situation in which two of the struts are brought into engagement with the notches.

In this case, as depicted in FIG. 3*b*, the upper strut 10 is pushed up earlier to be brought into abutment with the engagement wall of the notch 8. Consequently, the upper strut 10 is pushed by the notch plate 4 in the rotational direction of the notch plate 4 while causing eccentricity of the center of the pocket plate 2 from the center of the casing 7 until the upper ridge 14 of the pocket plate 2 is brought into abutment to the spline groove of the casing 7. That is, the upper ridge 14 of the pocket plate 2 is rotated within the endplay between the ridge 14 and the spline groove of the casing 7. As a result, the pocket plate 2 is allowed to be rotated by the principle of leverage utilizing a contact point between the upper ridge 14 of the pocket plate 2 and the spline groove of the casing 7 as a fulcrum. In this situation, the lower strut 11 is isolated away from the engagement wall of the lower notch 9 in the rotational direction until the lower ridge 15 comes into abutment to the spline groove of the casing 7. Consequently, the center of the pocket plate 2 is aligned again to the center of the casing 7, and the lower strut 11 is allowed to enter into the lower notch 9 to be brought into abutment to the engagement wall. As a result, both the upper strut 10 and the lower strut 11 are brought into engagement with the upper notch 8 and the lower notch 9.

According to the preferred example, therefore, it is possible to secure required time for bringing the lower strut 11 into engagement with the lower notch 9 even if the lower strut 11 is delayed to be pushed up. For this reason, an imperfect engagement of the lower strut 11 can be prevented to limit damage on the SOWC 1. In addition, since the strut symmetry with respect to the other strut brought into engagement earlier is brought into engagement in response to the engagement of the other strut, all of the struts can be brought into engagement certainly to prevent imperfect engagement of the SOWC 1.

Lastly, it will be apparent to those skilled in the art that various modifications and variations may be made to the disclosed selectable one-way clutch within the spirit of the present invention. For example, the pitch diameter between the ridges formed on the back face of the pocket plate may be altered arbitrarily according to need unless it is shorter than the pitch diameter between the struts. In addition, dimension and configuration of the ridge and spline groove may altered arbitrarily. Further, the pocket plate may also be fixed to the casing by fitting a ridge formed on the casing into a spline groove formed on the back face of the pocket plate.

What is claimed is:

1. A fixation structure for a selectable one-way clutch, comprising:
   a pocket plate and a notch plate being opposed to each other;
   a strut held in a pocket of the pocket plate while being allowed to project from the pocket;
   a selector plate having an aperture for letting through the strut that is interposed between the pocket plate and the notch plate while being allowed to rotate therebetween;
   a stationary member opposed to a back face of the pocket plate opposite to the notch plate to which the pocket plate is fixed; and
   an engagement portion formed on the back face of the pocket plate that is brought into abutment to the stationary member to stop rotation of the pocket plate;
   wherein a radial distance between the engagement portion fitted with the stationary member and a rotational center axis of the pocket plate is shorter than that between the strut and the rotational center axis of the pocket plate.

2. The fixation structure for a selectable one-way clutch as claimed in claim 1, wherein the engagement portion is fitted with the stationary member while assuring a predetermined end play in a rotational direction of the pocket plate.

3. The fixation structure for a selectable one-way clutch as claimed in claim 1, wherein the engagement portion includes a ridge formed on the back face of the pocket plate in such a manner to be splined to the stationary member.

* * * * *